NOISE SUPPRESSION CIRCUITS

Filed Nov. 12, 1948

Inventor:
Oliver H. Winn,
by Merton D. Moore
His Attorney.

Patented July 29, 1952

2,605,395

UNITED STATES PATENT OFFICE 2,605,395

NOISE SUPPRESSION CIRCUITS

Oliver H. Winn, Baldwinsville, N. Y., assignor to General Electric Company, a corporation of New York Application November 12, 1948, Serial No. 59,583

2 Claims. (Cl. 250—20)

Figure 1:
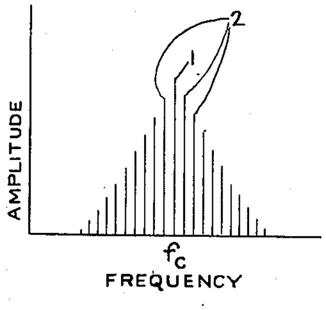

My invention relates in general to radio noise suppression circuits of the type commonly known as squelch or muting circuits. More particularly, my invention relates to a circuit adapted for use in communication receivers which maintains substantial silence at a loud speaker when no signals are being received or when received signals are too weak for satisfactory reproduction, but which maintains the receiver in continuously operating condition, ready for immediate reproduction of a signal of sufficient strength.

Since receivers in communication equipment normally are maintained tuned to a signal frequency and in operating condition, in the absence of a carrier, the receiver will reproduce noise unless some means is employed to mute an appropriate portion of the receiver system. Such muting means is generally known as a squelch system. When such a system is used, the reproducing means, usually the audio system of the receiver, is rendered inoperative until it is automatically rendered operative by the reception of a carrier wave at the input of the receiver. With such a squelch or muting system, the reception of annoying noise is prevented when no carrier is being received. Noise has a tendency to cause fatigue, and naturally its suppression lessens the strain on the operator whose efficiency is thereby increased.

It is desirable that a squelch system render the signal reproducing portion of a receiver operative when a carrier is being received and inoperative when noise alone is being received. Since both the level of the carrier and the intensity of noise vary with time and place, it is necessary to provide some means for distinguishing between the two. Heretofore, various systems, predicated on the difference in frequencies between noise and a signal, have been used to distinguish between them. One well-known system operates a squelch circuit from the differential of two voltages, the first being a voltage obtained indiscriminately from noise or from a received carrier when such is present, the second being a voltage obtained from noise components which fall within a predetermined frequency band outside the band of frequencies in which the signal superimposed on the carrier is contained. Another well-known squelch system, suitable for use in a frequency modulation receiver, utilizes an amplitude discriminator to derive a signal proportional to variations in amplitude of a carrier caused by noise interference. These systems suffer from certain disadvantages, their most obvious one being the complexity of the circuit required.

Accordingly, it is a main object of my invention to provide a new and improved squelch or muting circuit capable of distinguishing between a frequency modulated carrier and noise interference.

Another object of my invention is to provide a squelch or muting circuit which functions automatically to render operative a normally inoperative radio receiver when a carrier wave attains a predetermined level in the presence of noise interference.

My invention utilizes the difference in spectrum distribution between noise and a carrier signal to discriminate between the two. The spectrum of a frequency modulated carrier wave usually attains a maximum amplitude at the center frequency of the carrier and diminishes on either side; the spectrum of noise, on the other hand, is normally evenly distributed over the pass band of the receiver. It is well known that a balanced frequency discriminator produces no unidirectional output so long as the sums of the frequencies applied to it are equal on either side of the crossover point of the discriminator characteristic. In accordance with my invention, I provide an auxiliary frequency discriminator which is tuned so that the center frequency of the carrier occurs at a point of maximum amplitude of its characteristic, while noise in the pass band of the receiver is evenly distributed over the whole characteristic. Accordingly, while noise alone is being received, the auxiliary or squelch discriminator will have no unidirectional voltage at its output. However, as soon as a carrier is being received, a unidirectional voltage occurs at the output of this discriminator and the squelch circuit is disabled to render the signal reproducing portion of the receiver operative.

For additional objects and advantages and for a better understanding of the invention, attention is now directed to the following description and accompanying drawings, and also to the appended claims in which the features of the invention believed to be novel are particularly pointed out.

Figure 2:
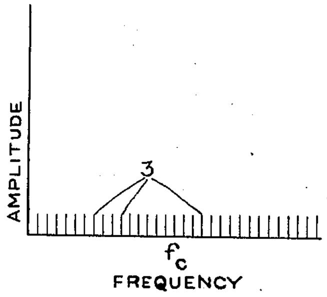
Figure 3:
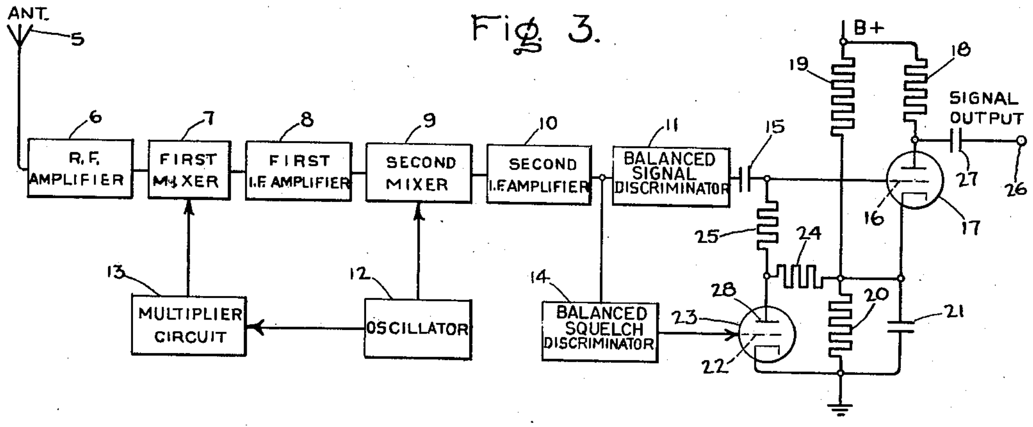
Figure 4:
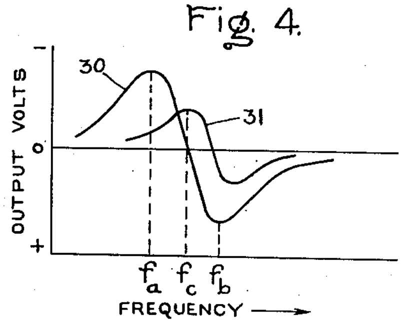

In the drawings, Figs. 1 and 2 are diagrams illustrating the spectrum of a frequency modulated carrier wave and of a generalized noise interference, respectively; Fig. 3 is a schematic diagram, partially in block form, of a frequency modulation receiver embodying my invention; and Fig. 4 shows a pair of curves illustrating certain operating characteristics of the frequency discriminators incorporated in the circuit of Fig. 3.

Referring to Fig. 1, the vertical line 1 represents the amplitude of the component of a frequency modulated carrier wave at its center frequency; the vertical lines 2 represent side frequencies above and below the carrier frequency, the whole making up the spectrum of the wave. The spectrum achieves a peak at the center frequency and decreases on either side. Fig. 2 shows a series of vertical lines 3 illustrating the amplitude of noise evenly distributed over the pass band of a receiver. The average amplitude of the noise is constant over the whole band even though it is continuously varying at any instant of time.

Referring to Fig. 3, there is shown a frequency modulation receiving system comprising the following elements connected in cascade in the order named: an antenna 5, a radio frequency amplifier 6, a first mixer 7, a first intermediate frequency amplifier 8, a second mixer 9, a second intermediate frequency amplifier 10, and a signal discriminator 11. An oscillator 12 provides an output to the second mixer 9 and also to a multiplier circuit 13, which in turn provides an output to the first mixer 7.

The various units just described may be of a conventional construction and operation, the details of which are known in the art.

Considering briefly the operation of the receiver as a whole, a desired frequency modulated signal is selected from the antenna 5 and amplified by the radio frequency amplifier 6. It is converted to a first frequency modulated intermediate frequency carrier signal in the first mixer 7 through the operation of the oscillator 12 and multiplier circuit 13. Thereafter, this signal is amplified by the first intermediate frequency amplifier 8 and converted to a second intermediate frequency carrier signal in the second mixer 9, through the operation of the oscillator 12. This signal is then further amplified by the second intermediate frequency amplifier 10, wherefrom it is supplied to a signal discriminator 11 and also to a squelch discriminator 14 having their inputs connected in parallel.

The frequency discriminators 11 and 14 may be of any well-known type, such as, for example, the circuit illustrated and described in United States Letters Patent No. 2,121,103, Seeley, granted June 21, 1938. The function of a frequency discriminator is to demodulate the frequency modulated waves which are coupled thereto and to provide an output signal having an amplitude proportional to the frequency deviation of the input wave from a center frequency to which the discriminator is adjusted. The signal discriminator 11 is adjusted to have an operating characteristic as illustrated by curve 30 of Fig. 4. This curve illustrates the characteristic of a balanced frequency demodulator having zero output when the frequency of the input wave is the center frequency of the carrier, namely, $f_c$ as shown. If the frequency of the input wave shifts to either side of this center frequency, a positive or a negative voltage is obtained between the limits $f_a$ and $f_b$ respectively. The squelch discriminator 14, on the other hand, has an operating characteristic in accordance with curve 31. The squelch discriminator is adjusted so that its operating characteristic attains a peak at the center frequency $f_c$ of the carrier. Also, it is adjusted so that the entire range of its characteristic between the two points of positive and negative maximum output fall entirely within the pass band of the receiver.

The output of the signal discriminator 11 is coupled through a capacitance 15 to the control grid 16 of an electron discharge device 17 connected as an amplifier. Operating potential for this device is supplied from a source indicated by the legend B+ and is coupled to the anode through a resistor 18. The cathode of device 17 is connected to a point of intermediate potential provided by the junction of resistors 19 and 20 serially connected between the source of potential indicated at B+ and ground; it is also by-passed for alternating currents by a capacitor 21 connected in parallel with resistor 20. The output of the squelch discriminator 14 is supplied to the control grid 22 of a squelch control device 33. The anode 28 of this electron discharge device is connected through a resistance 24 with the junction of resistors 19 and 20, and its cathode is grounded. The unidirectional potential existing at the anode of device 23 is coupled to the grid 16 of device 17 through a resistor 25.

The amplified signal output at the anode of device 17 is available at signal output terminal 26 connected to the anode through a capacitor 27.

In operation, when the signal and squelch discriminators are adjusted to have operating characteristics in accordance with curves 30 and 31 of Fig. 1, no unidirectional output appears at grid 22 of device 23 so long as noise alone is received. Accordingly, the bias at the grid of the squelch device 23 is zero and the anode of this device conducts current, which causes a potential drop across resistor 24. This, in turn, applies a negative bias to grid 16 of amplifier 17 and renders it nonconductive. Accordingly, no output voltage appears at terminal 26, and since in this case the only voltage which could appear would be caused by noise, the desired result is obtained. When a frequency modulated carrier wave is received, it operates on the squelch discriminator to provide a negative output voltage applied at the grid 22 of the squelch device 23. This voltage biases the squelch device 23 to cut off, which in turn removes the negative voltage drop across resistor 24 and eliminates the negative biasing at the grid 16 of the amplifying device 17. Device 17 accordingly returns to a condition of zero bias of its grid, and signal voltages from the signal discriminator 11, coupled to the grid through capacitor 15, are amplified and passed on the output terminal.

Thus, the receiver is normally squelched or muted in the absence of a carrier, even though noise is present, and it responds only to a signal attaining a peak amplitude at the center carrier frequency. Of course, even with the circuit which I have disclosed, it is well realized that noise or an interfering signal, which achieves a peak for a certain time duration at the center carrier frequency, will disable the squelch or muting circuit and render the signal amplifying circuits operative. However, this is a comparatively rare occurrence and, in practice, if consistently met with at the center carrier frequency, would normally be solved by changing the center carrier frequency to another value.

It is possible to combine the operation of the signal and squelch discriminators, which I have shown in Fig. 3, into a single discriminator circuit. This requires that the single discriminator have a much wider characteristic curve than necessary for signal reception alone. This single discriminator is then adjusted so that the cross-over point, that is, the frequency at which the discriminator provides zero out, is offset from the center carrier frequency. By so doing, a unidirectional voltage appears across the output of the single discriminator whenever a carrier wave is received, and this unidirectional voltage can be applied, through a low-pass filter to the grid 22, to operate the squelch valve 23 in the same manner as the output of squelch discriminator 14.

While certain specific embodiments have been described, it will, of course, be understood that various modifications may be made without departing from the invention. The appended claims are therefore intended to cover any such modifications within the true spirit and scope of the invention.

What I claim as new and desire to secure by Letters Patent of the United States is:

1. In combination, a pair of balanced frequency discriminators each connected to a common source of carrier wave and noise voltages, said carrier wave being frequency modulated about a center frequency in accordance with a signal, said discriminators each having substantially symmetrical frequency response characteristics providing an output proportional in magnitude and polarity to the frequency deviation of an applied voltage from a predetermined frequency of zero output and reaching a maximum at two limiting frequencies, said predetermined frequency being determined in each case by tuning adjustment of the respective discriminator, one of said discriminators being adjusted to have its frequency of zero output coincide with said center frequency, thereby to detect said signal means for amplifying the detected signal the other of said discriminators being adjusted to have one of its limiting frequencies coincide with said center frequency, thereby to provide a unidirectional potential output in the presence of said carrier wave, and means, rendered operative by said unidirectional potential, for controlling the gain of said amplifying means.

2. A noise suppression circuit comprising a signal channel having a certain pass band and adapted to translate carrier wave and noise component voltages within said band, said carrier wave being frequency modulated about a predetermined center frequency in accordance with a desired signal, means comprising a first balanced frequency discriminator tuned to said center frequency and connected to said channel for detecting said signal, an amplifier connected to said first discriminator for amplifying said signal, a muting circuit connected to said amplifier to render said amplifier inoperative in the absence of a received carrier wave, a second balanced frequency discriminator connected to said channel, said second discriminator being tuned to provide zero output potential in response to applied voltages of a different center frequency and a substantial output potential in response to applied voltages of said predetermined frequency, said output potential also being substantially zero when said voltages are evenly distributed over said band, and means to disable said muting circuit in accordance with said potential, thereby to render said amplifier operative when a carrier wave is received.

OLIVER H. WINN.

REFERENCES CITED

The following references are of record in the file of this patent:

UNITED STATES PATENTS

| Number | Name | Date |
|---|---|---|
| 2,098,286 | Garfield | Nov. 9, 1937 |
| 2,261,643 | Brown | Nov. 4, 1941 |
| 2,264,151 | Reid | Nov. 25, 1941 |
| 2,273,098 | Foster | Feb. 17, 1942 |
| 2,356,224 | Crosby | Aug. 22, 1944 |
| 2,497,103 | Toth | Feb. 14, 1950 |
| 2,524,851 | Stodola | Oct. 10, 1950 |